US006343216B1

(12) United States Patent
Kim et al.

(10) Patent No.: US 6,343,216 B1
(45) Date of Patent: Jan. 29, 2002

(54) METHOD OF AUTOMATICALLY RECONNECTING A DROPPED CALL IN A MOBILE COMMUNICATION SYSTEM

(75) Inventors: Nak-Koo Kim, Songnam-shi; Seok-Jin Ham, Seoul; Jun-Hwan Oh, Seoul; Su-Jeong Lee, Seoul, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/454,132

(22) Filed: Dec. 3, 1999

(30) Foreign Application Priority Data

Dec. 3, 1998 (KR) ........................................ 98-52759

(51) Int. Cl.[7] ........................................ H04Q 7/20

(52) U.S. Cl. ...................... 455/450; 455/414; 455/445; 455/458

(58) Field of Search ................................ 455/404, 414, 455/423, 426, 436, 453, 458, 445, 510, 517, 450; 379/201, 209

(56) References Cited

U.S. PATENT DOCUMENTS 4,654,867 A * 3/1987 Labedz et al. ............. 455/438
4,912,756 A * 3/1990 Hop ........................... 379/60
5,146,214 A * 9/1992 Yamada et al. ........ 340/825.03
5,239,571 A 8/1993 Takahashi .................... 379/58
5,546,382 A 8/1996 Fujino ......................... 370/24
5,566,236 A * 10/1996 MeLampy et al. .......... 379/201
6,148,190 A * 11/1998 Bugnon et al. ............. 455/404
5,867,782 A * 2/1999 Yoon .......................... 455/421
5,950,114 A * 9/1999 Balachandran et al. .... 455/38.1
5,995,830 A * 11/1999 Amin et al. ................ 455/423
6,032,040 A * 2/2000 Choy et al. ................. 455/414
6,097,952 A * 8/2000 Kawabata ................... 455/435
6,157,828 A * 12/2000 Krishnamurthi ............ 455/414
6,240,284 B1 * 5/2001 Bugnon et al. ............. 455/404
6,246,872 B1 * 6/2001 Lee et al. ................... 455/414

* cited by examiner

*Primary Examiner*—Dwayne Bost
*Assistant Examiner*—Miguel D. Green
(74) *Attorney, Agent, or Firm*—Dilworth & Barrese, LLP

(57) ABSTRACT

An automatic dropped call reconnection method in a mobile communicating system is described. When a call in progress is dropped due to service impediment factors, the dropped call is automatically reconnected by paging. The base station (BS) informs the mobile switching center (MSC) of the service impediment, the MSC sends a reconnection paging request to a group of base stations and/or another MSC. The group of base stations attempt reconnection paging with the mobile station.

19 Claims, 10 Drawing Sheets

700 (rows 1–10), 710 (RECONNECTION FLAG row)

| INFORMATION ELEMENT | DIRECTION | TYPE |
|---|---|---|
| MESSAGE TYPE | MSC->BS | M |
| MOBILE IDENTITY | MSC->BS | M |
| TAG | MSC->BS | O |
| CELL IDENTITY LIST | MSC->BS | O |
| MOBILE IDENTITY (ESN) | MSC->BS | O |
| SLOT CYCLE INDEX | MSC->BS | O |
| SERVICE OPTION | MSC->BS | O |
| SIGNALING TYPE | MSC->BS | O |
| SINGLE WORD PAGE | MSC->BS | O |
| RECONNECTION FLAG | MSC->BS | O |

*FIG. 7A*

| 7 | 6 | 5 | 4 | 3 | 2 | 1 | 0 | OCTET |
|---|---|---|---|---|---|---|---|---|
| ELEMENT IDENTIFIER | | | | | | | | 1 |
| SPARE | | | | | | | RECONN. FLAG | 2 |

RECONNECTION FLAG = 0 :NORMAL PAGING
1 :PAGING FOR RECONNECTION OF DROPPED CALL

*FIG. 7B*

METHOD OF AUTOMATICALLY RECONNECTING A DROPPED CALL IN A MOBILE COMMUNICATION SYSTEM

PRIORITY

This application claims priority to an application entitled "Method of Automatically Reconnecting Dropped Call in Mobile Communication System" filed in the Korean Industrial Property Office on Dec. 3, 1998 and assigned Serial No. 98-52759, the contents of which are hereby incorporated by reference.

BACKGROUND OF THE INVENTION

1. Field of the Invention

The present invention relates generally to the field of wireless communications, and in particular, to a method of reconnecting a dropped call in a mobile communication system.

2. Description of the Related Art

In a public land mobile network (PLMN), a connection is made between a base station (BS) and a mobile station (MS) in a radio environment. In some cases, call service cannot be provided in shadow areas due to physical characteristics of the radio environment which adversely affect signal propagation. In the case where a terminal subscriber roams on foot or is moving in a vehicle, a call can be temporarily dropped. In accordance with conventional technology, if a call drop lasts for a predetermined time period, it is determined that call service cannot be provided and the call is released. In IS-95, the predetermined time is approximately 5 seconds (i.e., equal to one frame duration 20 ms×270). Upon this unintended call release, the calling party must attempt to call the called party again.

To overcome the aforestated problem of call drops, several approaches have been suggested in the prior art including:

(1) U.S. Pat. No. 5,546,382: reconnection of a circuit to continuously provide a data communication service upon generation of a transmission failure;

(2) U.S. Pat. No. 5,239,571: reconnection of an abnormally terminated communication line by adding a separate device to a terminal or modifying the terminal. That is, with the aid of a RAM in the terminal for storing information on call origination and call termination, a call is automatically set up in the case of an abnormal disconnection of a call; and (3) U.S. Pat. No. 5,566,236: reconnection of a disconnected telephone communication by use of a nearby telecommunication system (e.g., PBX: Private Branch Exchange, and Centrex: Centralized PBX Service) whereby the concept of an intelligent network is introduced.

SUMMARY OF THE INVENTION

An object of the present invention is to provide a method of automatically reconnecting a dropped call during call setup by paging in a mobile communication system.

Another object of the present invention is to provide a method of automatically reconnecting a call dropped during call service by paging in a mobile communication system.

Briefly, these and other objects are accomplished by a method of automatically reconnecting a communication link terminated by a service impediment during service between a mobile terminal of a first subscriber and a terminal of a second subscriber with the first subscriber communicating through one of a plurality of base stations (BSs) connected to the mobile terminal and at least one of a plurality of mobile switching centers (MSCs) connected to the BS in a mobile communication system having the plurality of BSs and the plurality of MSCs. In accordance with the method, when the service impediment lasts for at least a first predetermined time period, the serving BS transmits service impediment detection information to the MSC connected to the serving BS. Then, at least one of the BSs which receive a reconnection paging request from the MSC attempts a reconnection paging. The terminated service is reinitiated between the mobile terminal of the first subscriber and the terminal of the second subscriber through a BS which receives a response for the reconnection paging from the mobile terminal of the first subscriber and one of the plurality of MSCs connected to the BS, when the mobile terminal of the first subscriber responds to the reconnection paging.

BRIEF DESCRIPTION OF THE DRAWINGS

The above and other objects, features and advantages of the present invention will become more apparent from the following detailed description when taken in conjunction with the accompanying drawings in which:

FIG. 7A illustrates the format of a paging request signal according to an embodiment of the present invention;

FIG. 7B illustrates in detail the reconnection flag defined in the page request signal shown in FIG. 7A;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Terms and Definitions

"A call service in progress": a state where voice communication and/or data communication of still images, moving pictures, and the like are being performed.

"Dropped call": a call provided in a call service which can no longer be maintained either temporarily or permanently. A dropped call may be caused by either a call disconnection, noise on a specific channel, or unavailable service situations.

"Call disconnection": the state where a call remains disconnected for a predetermined time.

An embodiment of the present invention will be described within the context of the North American digital mobile communication system standard (IS-95, IS-634, and IS-41 series) by way of example. The present invention is also applicable to Third generation radio telecommunication (cdma2000, UMTS IMT-2000) which provides the additional services of high quality voice, high speed data, moving pictures, and Internet browsing.

Figure 1:
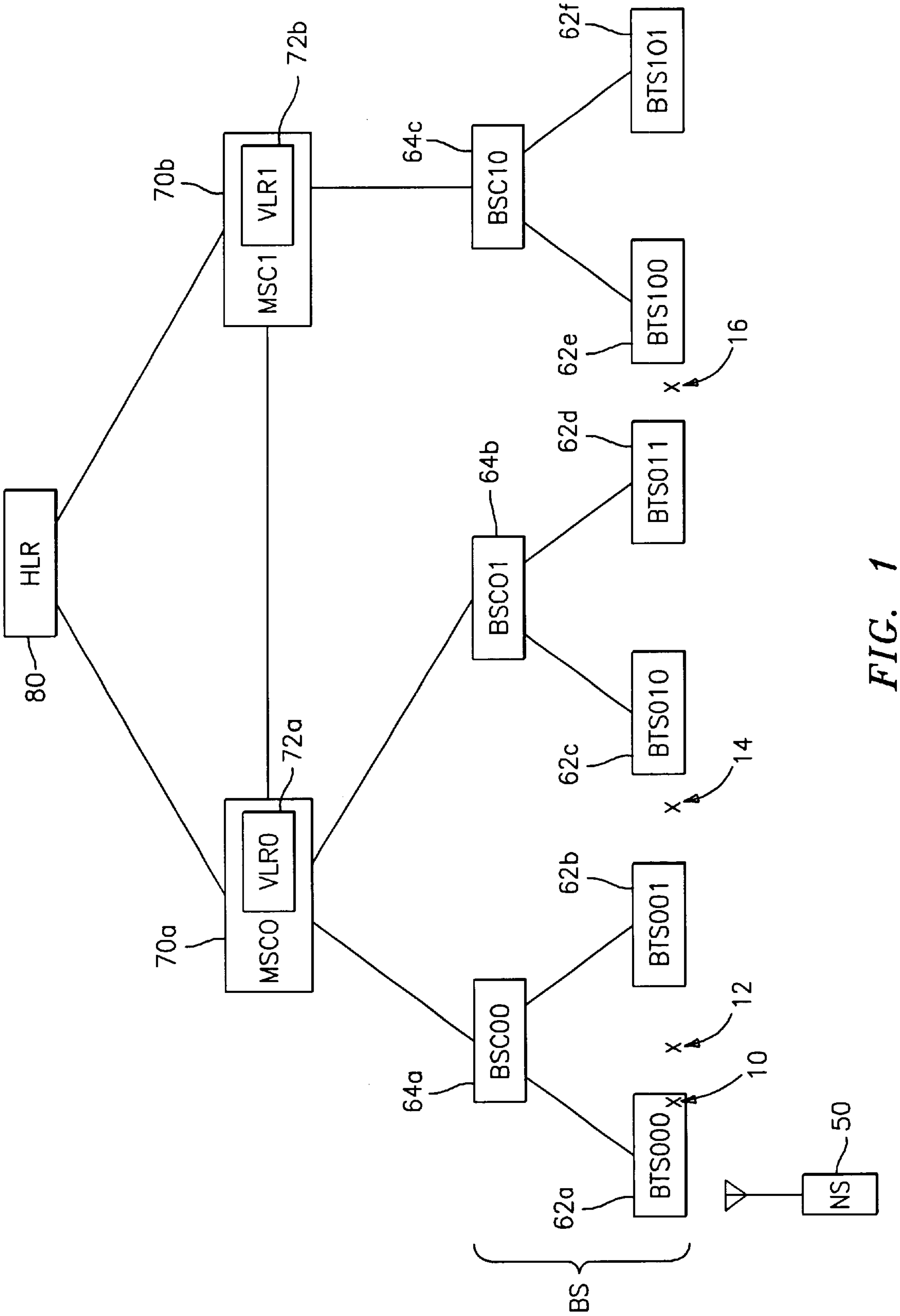
FIG. 1 is a block diagram of an example of a mobile communication system to which an embodiment of the present invention is applied.

Referring to FIG. 1, the mobile communication system to which the present invention is applied includes an HLR (Home Location Register) 80, MSCs (Mobile Switching Centers) MSC0 70*a* and MSC1 70*b*, BSCs (Base Station Controllers) BSC00 64*a*, BSC01L 64*b*, and BSC10 64*c*, BTSs (Base Station Transceiver Subsystems) BTS000 62*a* to BTS101 62*f*, and an MS 50. A plurality of HLRs and MSCs are interconnected in the PLMN to perform subscriber management and call switching. As shown in FIG. 1, a single HLR 80 is connected to a plurality of MSCs MSC0 70*a* and MSC1 70*b*. Each MSC is in turn connected to a plurality of BSCs, and each BSC to a plurality of BTSs. A BS is typically comprised of a single BSC and multiple BTSs.

An MSC controls a connection to the PSTN (Public Switch Telephone Network) and the PLMN. A BSC controls a radio link and performs handoffs, a BTS forms a radio link with an MS and manages radio resources, and an HLR registers subscriber locations and serves as a database for storing subscriber information. Each MSC has a VLR (Visitor Location Register) for temporarily storing the information of an MS entering the service area of the MSC. If the MS moves into another service area, the stored information is discarded.

For a call set-up, the mobile communication system assigns radio channels between an MS and a BTS, forms communication links between the BTS and a BSC, between the BSC and an MSC, and between the MSC and the PLMN or an external network such as PSTN. If the established call cannot be maintained for a predetermined time because the MS is in a shadow area or due to characteristics of the radio environment, the mobile communication system typically disconnects the call. Shadow area problems may arise from a number of situations including, for example, an elevator, a relay-free tunnel, a long tunnel located between adjacent cells, a shadow area among dense region of tall buildings.

A call drop as defined in an embodiment of the present invention can occur in such locations as indicated by reference numerals 10, 12, 14, and 16 in FIG. 1.

Reference numerals 10, 12, and 14 indicate locations of a dropped call within the same MSC area, and reference numeral 16 indicates a location of a dropped call between BTSs covered by different MSCs. Specifically, reference numeral 10 denotes a call dropped location of the MS 50 communicating with the BTS000 62*a* within the coverage area of the BTS000 62*a*, reference numeral 12 denotes a call dropped location of the MS 50 communicating with the BTS000 62*a* or the BTS001 62*b* in the service area of the BSC00 64*a*, and reference numeral 14 denotes a call dropped location of the MS 50 communicating with the BTS001 62*b* or the BTS010 62*c* on the border of their coverage areas.

A BS and an MSC of FIG. 1 control the reconnection of a dropped call, possibly using the same algorithm.

Reconnection of a dropped call is disclosed in detail in U.S. application Ser. No. 09/294,046. The preferred embodiment of the present invention differs from U.S. application Ser. No. 09/294,046 by using paging in order to reconnect a dropped call.

Figure 2:
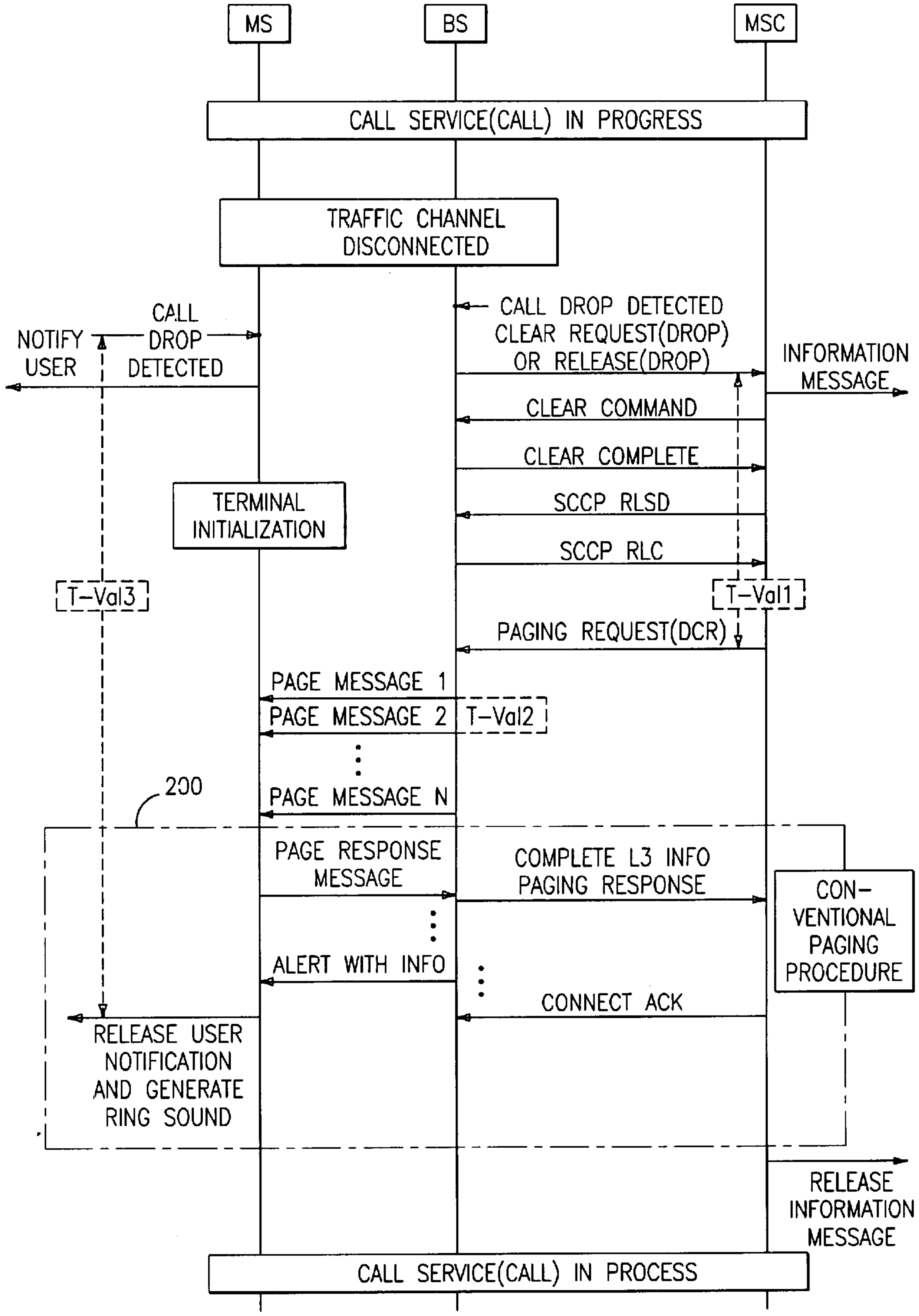
FIG. 2 is a flowchart illustrating a method for processing a dropped call according to an embodiment of the present invention.
Figure 3:
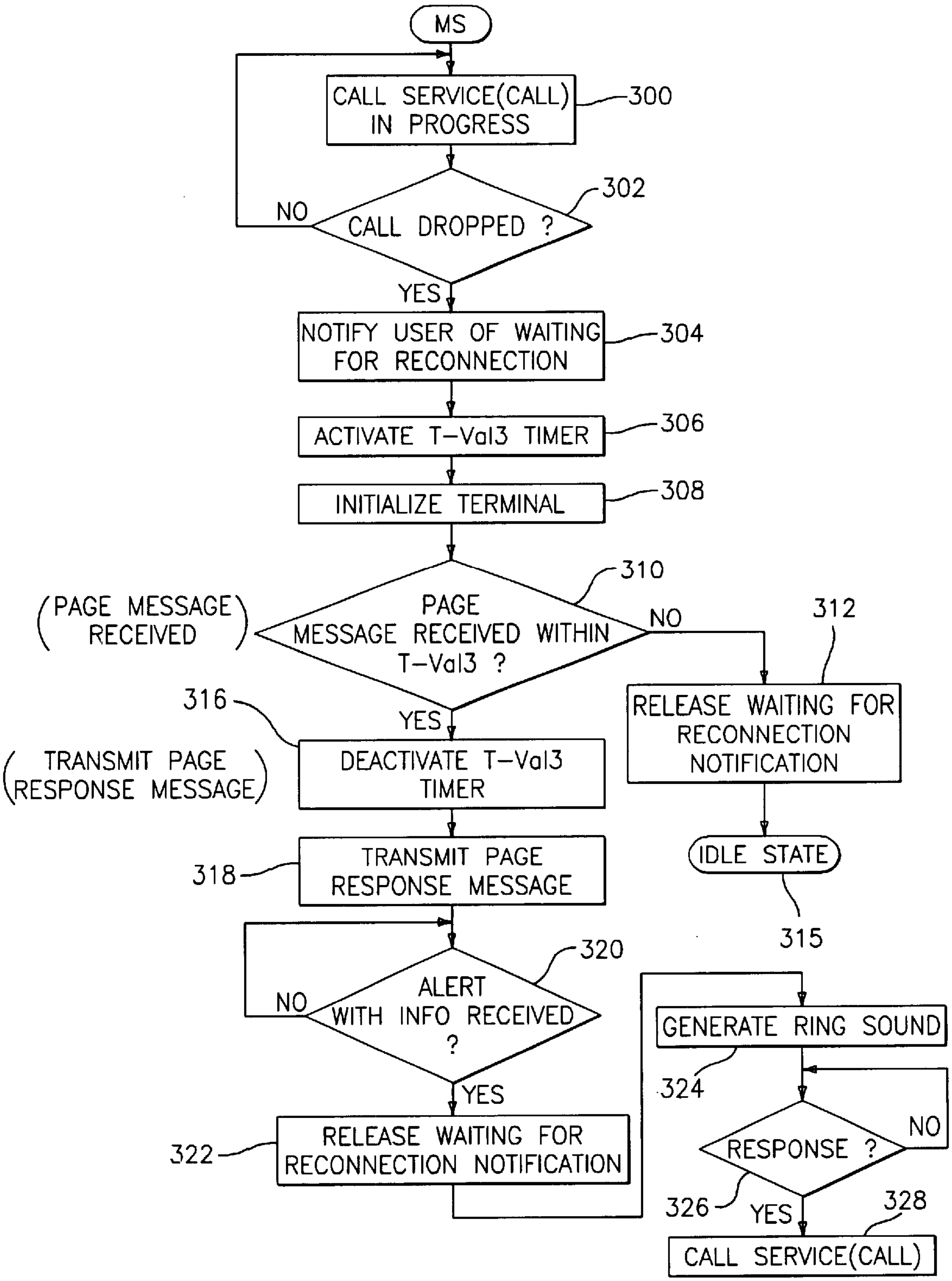
FIG. 3 is a flowchart depicting an MS control operation according to an embodiment of the present invention.
Figure 4:
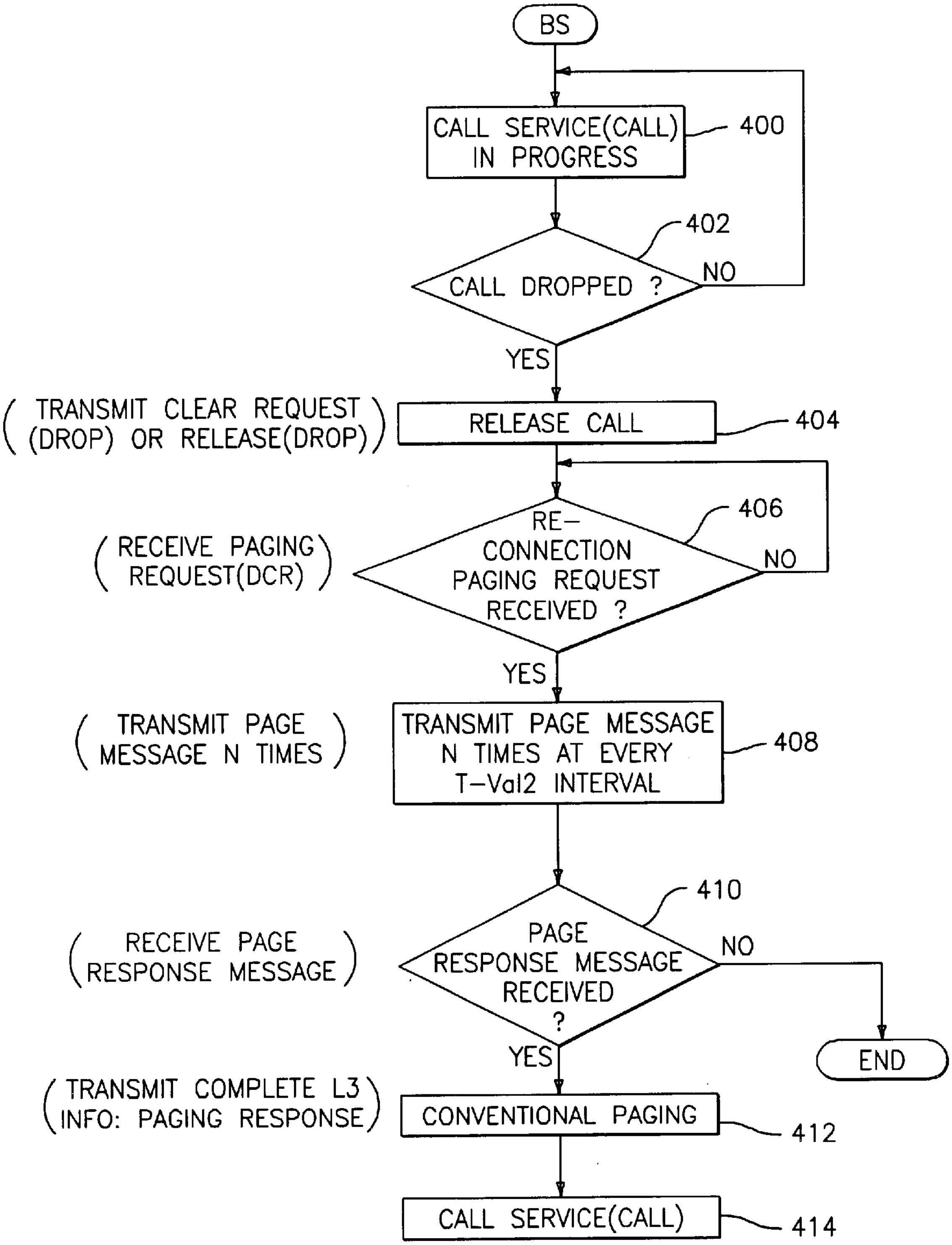
FIG. 4 is a flowchart depicting a BS control operation according to an embodiment of the present invention.
Figure 5:
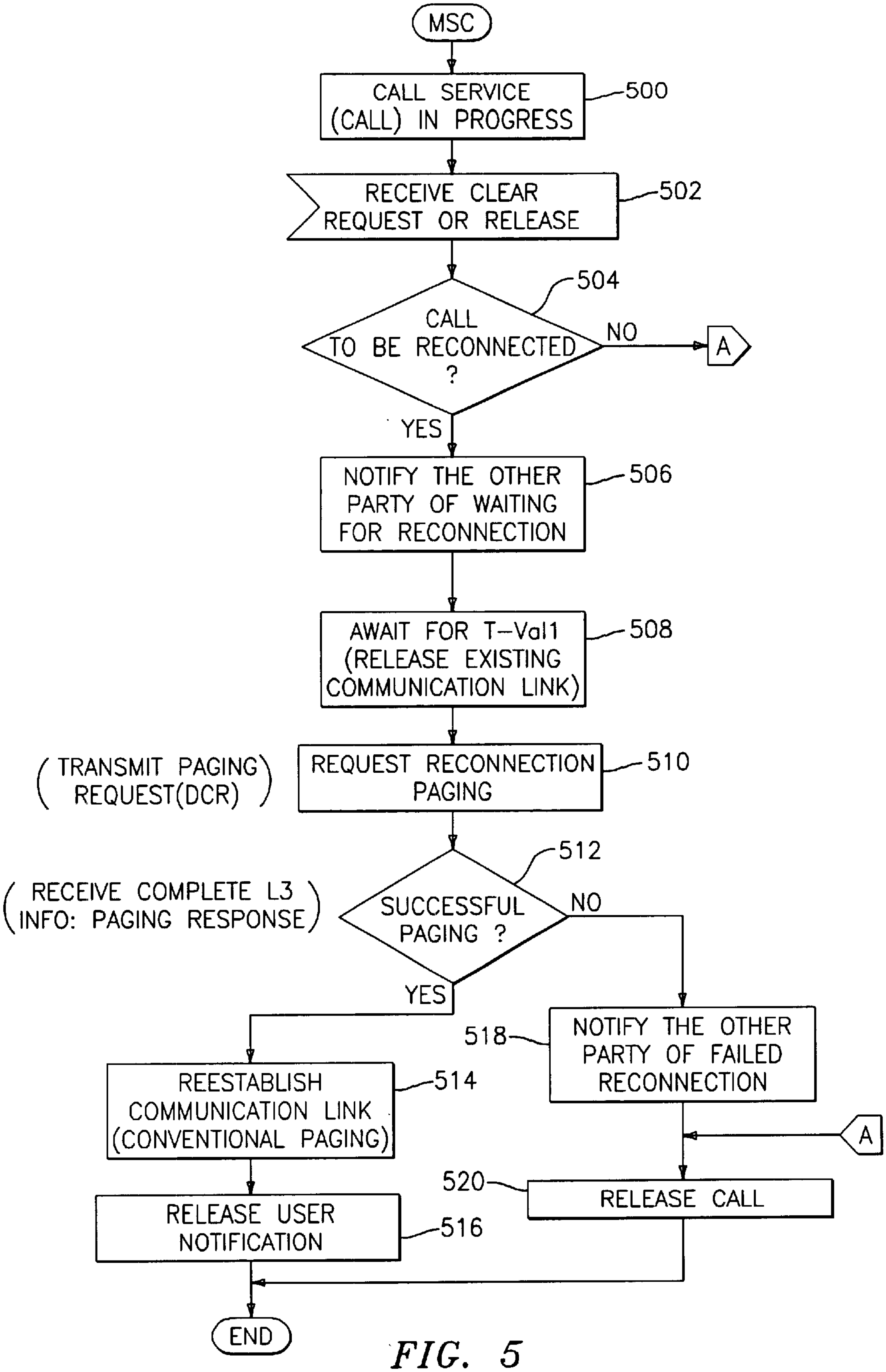
FIG. 5 is a flowchart depicting an MSC (Mobile Switching Center) control operation according to an embodiment of the present invention.

FIG. 2 is a flowchart of a call process in which a dropped call is released and then reconnected according to an embodiment of the present invention. FIGS. 3, 4, and 5 are flowcharts depicting control operations in an MS, a BS, and an MSC, respectively, according to an embodiment of the present invention.

Reconnection of a dropped call in accordance with an embodiment of the present invention will be described referring to FIGS. 2 to 5.

When a call is established and then the traffic channel in current use for the call (call service) is disconnected, the MS and the BS determine whether the call has been dropped. In steps 300 of FIG. 3 and 400 of FIG. 4, the MS and BS determined that the call service is in progress. Then, upon disconnection of the traffic channel, the MS and the BS determine whether the call has been dropped in steps 302 of FIG. 3 and 402 of FIG. 4. As disclosed in Korea Patent No. 98-13789, if no frames have been received for a predetermined time (one to ten seconds) on the current traffic channel or if successively received frames have errors, the MS and the BS consider the call as having been dropped. The predetermined time is preferably 1.2 seconds. The time of 1.2 seconds is shorter than the 5 seconds set for releasing a call in the prior art.

The ways an MS and a BS detect a call drop will be described in more detail.

Figure 10:
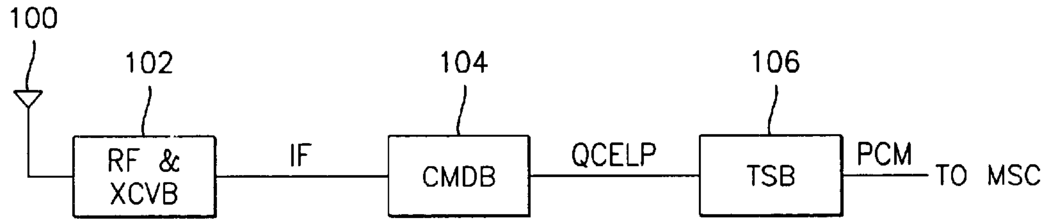
FIG. 10 is a block diagram of a BS method for detecting a call drop according to an embodiment of the present invention.

FIG. 10 is a block diagram of the BS way of detecting a call drop. Referring to FIG. 10, a CDMA signal received through an antenna 100 is converted to an IF (Intermediate Frequency) signal by an RF & XCVB (Radio Frequency & Transceiver Block) 102. A CMDB (CDMA Modulation and Demodulation Block) 104 converts the IF signal to a QCELP (Qualcomm Code Excited Linear Predictive coding) packet. During this operation, the CMDB 104 determines whether a packet frame is normal by checking its CRC (Cyclic Redundancy Code) and how much the frame is defective, and adds the abnormality indicating information (Quality Matrix: H 00-H ff) to the converted packet. If the abnormality indicating information is zero, a TSB (transcoder) 106 subjects the packet frame received from the CMDB 1040 to an abnormality operation. If it is one, the TSB 106 converts the received packet frame to a PCM (Pulse Code Modulation) signal and sends the PCM signal to an MSC.

Upon determination that a packet frame is bad, the TSB 106 counts continuous errors and unreceived frames using a timer interrupt generated every 20 ms to make a final decision whether a call is dropped or not. That is, it is determined whether a frame is received at each 20 ms interrupt.

If 20 consecutive bad frames are received from the CMDB 104, the TSB 106 considers it to be predictive of a call drop. Then, if a predetermined number of consecutive bad frames are received for a first predetermined time, the TSB 106 determines that the call is dropped. Assuming that the first predetermined time is 2 seconds, the TSB 106 declares a call drop if it receives 80 consecutive bad frames. However, if two consecutive normal frames are received, a bad frame counter is initialised and the TSB 106 returns to a normal operation. On the other hand, if any of 20 consecutive frames is not received, the TSB 106 considers it to be predictive of a call drop. Then, if no consecutive frames are received for a second predetermined time, the TSB 106 determines that the call in progress is dropped. The second predetermined time is preferably shorter than the first predetermined time.

Now, an MS detection of a call drop will be described. An MS monitors a forward traffic channel in an MS control on the traffic channel state. When the MS receives L (L is a natural numeral) consecutive bad frames on the forward traffic channel, it disables its transmitter. Then, if M (M is a natural numeral) consecutive frames are received, the MS enables the transmitter. The MS activates a fade timer for the forward traffic channel when the transmitter starts to act, in a traffic channel initialisation substate of the MS control on the traffic channel state. The fade timer is reset to N seconds when M consecutive good frames are received. When no consecutive good frames are received until the fade timer has expired, the MS disables the transmitter and declares a call drop.

Upon detection of a call drop in steps 302 of FIG. 3 and 402 of FIG. 4, the MS notifies the MS user that it is waiting for reconnection in step 304 of FIG. 3, and the BS performs a call release procedure in step 404 of FIG. 4. The MS can notify the MS user by illuminating an LED (Light Emitting Diode), displaying a message on a terminal display, sounding specific tones, or announcing a notification message by voice. The MS user can also be informed of the automatic reconnection of a dropped call through the above methods.

Meanwhile, upon detection of the call drop, the BS notifies the MSC of the call drop by using an existing message or a new message. In the former case, element values in the existing message are combined without any modification to the existing message or a newly defined element is added to the existing message, in order to notify the MSC of a call drop.

The call release procedure in the BS will be described in connection with FIG. 2.

Upon detection of the call drop, the BS transmits a release signal <Clear Request (DROP) or Release (DROP)>, shown in FIG. 2, including information indicative of the call drop to the MSC. If the call drop indicating information is set to, for example, 1 (=DROP), the release signal can be defined as a dropped call-caused call release signal. If it is set to 0 (=NORMAL), it can be defined as a normal call release signal.

Upon receipt of the release signal <Clear Request or Release> in step 502 of FIG. 5 during a call (call service) in step 500 of FIG. 5, the MSC determines in step 504 of FIG. 500 whether the dropped call is to be reconnected based on the call drop indicating information. For example, if the call drop indicating information is set to 1 (=DROP), the MSC determines that the dropped call should be reconnected.

The call drop indicating information can be included in or added to the existing release signal <Clear Request or Release> based on IS-634 in two ways. In one way, a call drop indicating parameter can be set by use of available values defined in a "Cause" information field among message types, that is, Cause, Circuit Identity, and Code Extension, in the format of the release signal. Values defined in the "Cause" information field available as the call drop indicating parameter include Uplink Quality (Cause: 0×02), Uplink strength (Cause: 0×03), MS not equip (0×20), and BS not equip (0×25). In the second way, a call drop indicating field is added to the signal format of <Clear Request or Release> based on IS-634.

Besides the existing release signal, the BS can use a newly defined message for transmitting the call drop indicating information to the MSC. The new message is configured in the same manner as the signal <Clear Request or Release>.

If in step 504, the dropped call is not to be reconnected, the MSC releases the call in step 520 of FIG. 5. On the contrary, if the dropped call is to be reconnected, the MSC transmits an information message notifying the other subscriber or a service provider of the waiting for a reconnection to the other in step 506 of FIG. 5. The information message takes the form of voice message, music, tone, or mute for the other telephone subscriber, whereas it takes the form of null data for a data communication subscriber and a data service provider.

In step 508 of FIG. 5, the MSC awaits for a timer value T-Val1. It should be noted here that a communication link between the other subscriber and the MSC is maintained and the information message is transmitted to the other subscriber on this communication link. The timer value T-Val1 ranges from several seconds to several tens of seconds and it is used to determine the action time of attempting a paging request for reconnection of a dropped call after receipt of a dropped call-caused release signal call. T-Val1 is preferably about 2 to 5 seconds, registered as initialisation data, and is varied by an operator according to system operation status and subscriber characteristics.

For T-Val1, typical call release procedures (<Clear Command>, <Complete>, <SCCP RLSD>, and <SCCP RLC>) based on IS-634 are performed between the BS and the MSC in steps 404 of FIG. 4 and 508 of FIG. 5.

When T-Val1 expires, the MSC attempts a paging request in step 510 of FIG. 5. That is, referring to FIG. 2, the MSC transmits a paging request signal <Paging Request (DCR)> to the BS. The (DCR) included in <Paging Request (DCR)> indicates that the paging request is for dropped call reconnection. The paging request signal for call connection, <Paging Request> defined in IS-634 includes information elements indicated by reference numeral 700 in FIG. 7A. The paging request signal <Paging Request (DCR)> according to an embodiment of the present invention is constructed by adding an information element "reconnection flag" indicated by reference numeral 710 to the information elements 700 shown in FIG. 7A. FIG. 7B illustrates the format of the paging request signal including the reconnection flag. The paging request signal has one information bit in a spare area. If the reconnection flag is set to 0 (=NORMAL), the paging request signal is a normal one, whereas if it is set to 1 (=DCR), the paging request signal is used for reconnection of a dropped call.

The MSC transmits the signal <Paging Request (DCR)> to a corresponding BS alone or the corresponding BS and its adjacent BSs together. The latter case is preferable.

A paging area for reconnection of a dropped call according to an embodiment of the present invention will be described in detail. The paging area for reconnection can be preset as internal data in the MSC. Only the cell where a called subscriber is located is paged for reconnection or a paging area including adjacent cells is paged. Or the MSC can page a broad area including all the cells covered by the MSC. In an embodiment of the present invention, paging the corresponding cell only, the paging area, and the broad area are termed cell paging, PAI (Paging Area Identification) paging, and broad paging, respectively.

Cell paging is primarily implemented and PAI paging is used to obtain a higher paging success rate than cell paging. It is preferable to use PAI paging as secondary paging after the primary paging or as the primary paging. Broad paging is used when the location of an MS is not detected or to increase the paging success rate by using a wider paging area after failure of a primary paging.

Returning to FIG. 5, the MSC transmits <Paging Request (DCR)> to the BS in step 510 of FIG. 5, which the BS is checking for in step 406 of FIG. 4. Then the BS transmits the page message shown in FIG. 2 N times at every timer value T-Val2 in step 408 of FIG. 4. That is, page message 1 to page message N are sequentially transmitted, one each for every T-Val2. T-Val2 is a few seconds, preferably ranges between 0.1 and 1 second to represent the time of transmitting the next page message. T-Val2 is registered as initialisation data and can be varied by an operator according to system operation status and subscriber characteristics.

In accordance with an embodiment of the present invention, it is preferable that the BS attempts cell paging as the primary paging, a PAI paging as the secondary paging, and then PAI paging across a wider area than the previous PAI paging. Broad paging is preferably performed when the location of an MS is not detected. The paging success rate can be increased by setting the paging area according to the environment and the number of pagings.

Figure 11:
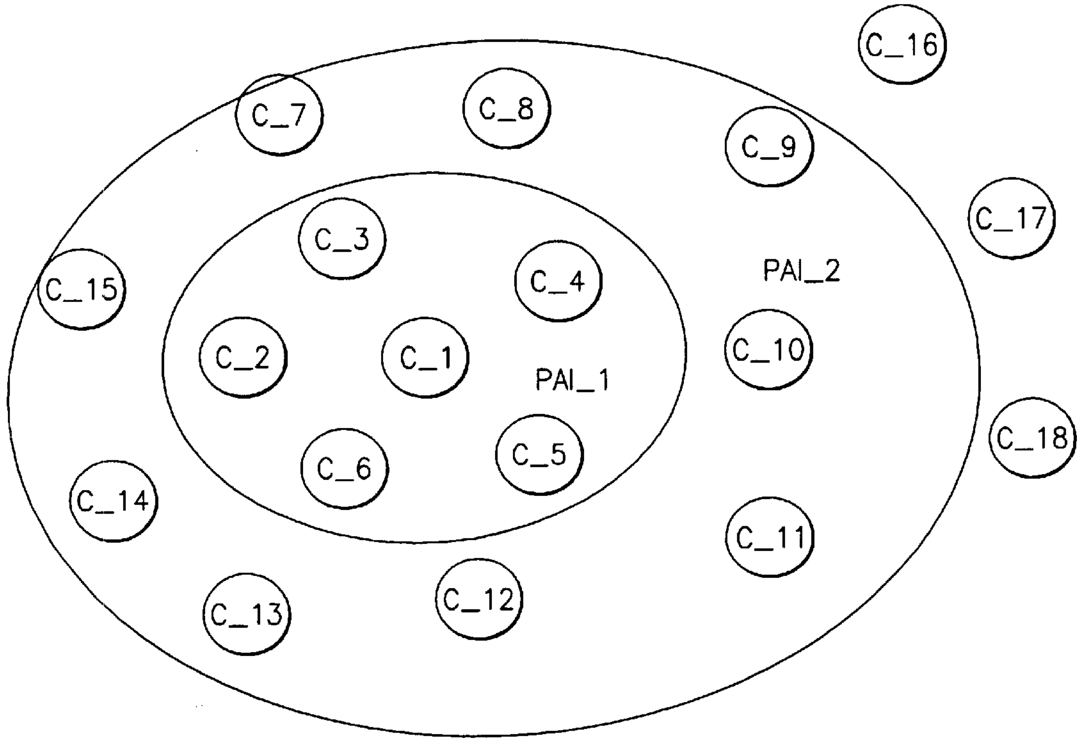
FIG. 11 illustrates paging areas each including a corresponding cell and its adjacent cells.

FIG. 11 illustrates an example of a paging area including a corresponding cell and its adjacent cells for call reconnecting paging. In FIG. 11, C_1 to C_18 denote cells. If an MS is located in cell C_1, an MSC issues a primary paging request to all the cells C_1 to C_6 within an area PAI_1. The cells may be within the coverage area of the same MSC or different MSCs. If there is no response to the primary paging, the MSC can issue a paging request to an area wider than the area PAI_1. That is, secondary paging can be requested to wider area PAI_2 or broad paging can be requested to all the cells within the MSC.

In the case that a cell to which a reconnection paging is requested is within an MSC different from an MSC of its adjacent cells, the former MSC should issue a paging request to the latter MSC by an Intersystem Page 2.

Figure 12:
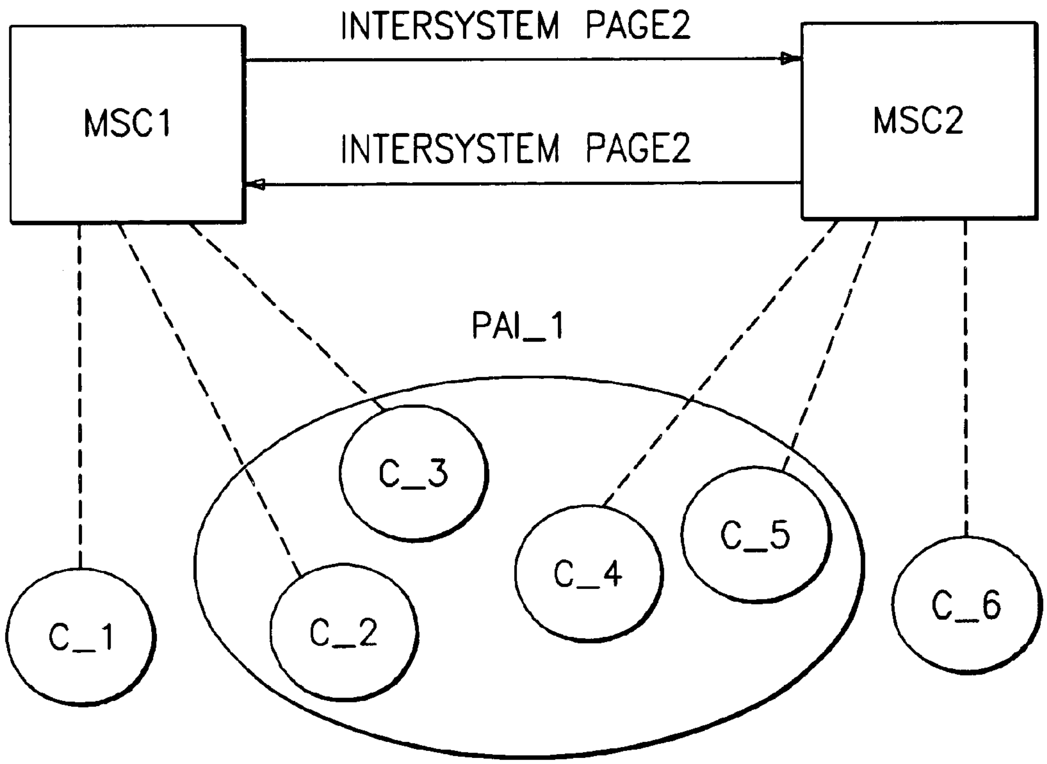
FIG. 12 illustrates an exemplary use of an intersystem page according to an embodiment of the present invention.

FIG. 12 illustrates an example of the Intersystem Page 2 according to an embodiment of the present invention. Referring to FIG. 12, if a cell in which a call is terminated is C_3, a call originating from MSC1 requests a call reconnection paging to the cells within the area PAI_1, that is, C_2 to C_5. The MSC1 can issue the paging request directly to the cells C_2 and C_3 but must transmit a message including the IDs of the cells C_4 and C_5 to a MSC2 by the Intersystem Page 2 so that the MSC2 can issue a paging request to the cells C_4 and C_5. Upon receipt of the message, the MSC2 attempts a paging request to the cells C_4 and C_5. Upon receipt of a response to the paging request from a BS, the MSC2 transmits the received response to the MSC1 by Intersystem Page 2. Intersystem Page 2 can increase the paging success rate for a subscriber at the boundary between MSCs.

The number of page messages directed from the BS to the MS in step 408 of FIG. 4 will be described in detail. Upon receipt of the paging request signal <Paging request (DCR)> from the MSC, the BS transmits a page message to the MS. Generally, one page message is sent for one received paging request signal. In accordance with an embodiment of the present invention, the reconnection flag is set to a value requesting call reconnection paging in the paging request signal. So, the BS transmits the page message several times as set in the paging request signal using its internal data in the case of a dropped call. Then, the MS is more likely to receive the page message, thereby increasing a paging success rate.

Returning to FIG. 3, when it detects a call drop, the MS notifies the user that it is waiting for reconnection in step 304 and activates a timer set to timer value T-Val3 in step 306. T-Val3 is several tens of seconds, preferably 30 seconds, and is the predetermined time in which a page message should be received from the BS after detection of a call drop. In step 308, the MS is initialised. System reacquisition is performed during the initialisation, and then an MS idle state is maintained.

In step 310, the MS determines whether a page message has been received from the BS within T-Val3. If the MS fails to receive the page message within T-Val 3, the MS releases the announcement of reconnection waiting status in step 312 and is placed in the idle state in step 315. If the MS receives the page message within T-Val3, the T-Val3 timer is released in step 316 and a communication link is established by a conventional paging method defined in the IS-634 standard in steps 318 to 328.

Figure 6:
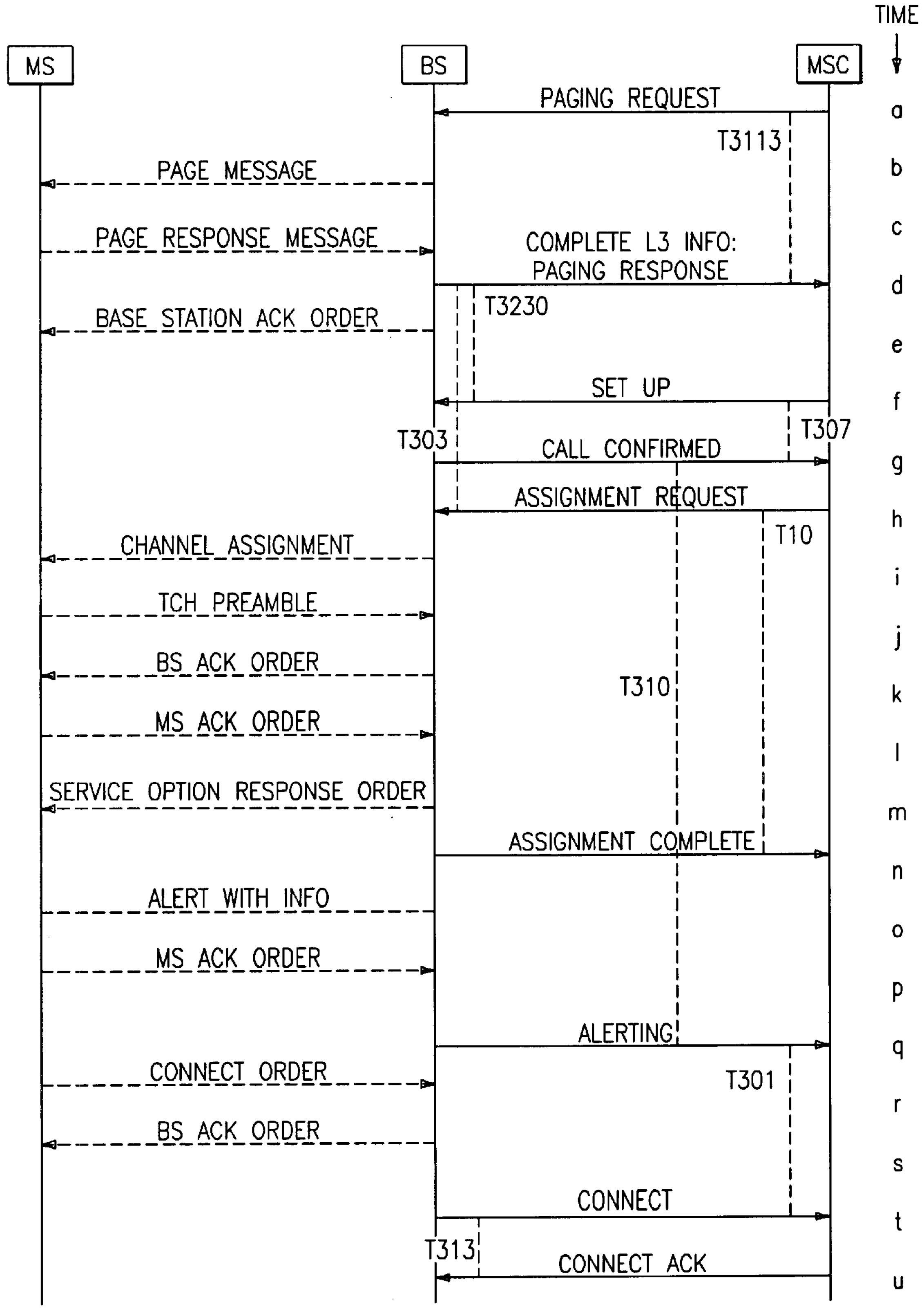
FIG. 6 is a flowchart depicting call processing in a conventional paging method based on the IS-634 standard.

Referring to FIG. 2, block 200 denotes the conventional paging procedure based on IS-634, and signals in block 200 are shown for better understanding of an embodiment of the present invention. FIG. 6 is a flowchart depicting the call connection process by the conventional IS-634 paging method, specified in block 200 of FIG. 2.

There will be hereinbelow given a description of a call reconnection in an MS, BS, and MSC after receipt of a page message in the MS with reference to FIGS. 2 and 6. Upon receipt of the page message, the MS transmits a page response message to the BS in steps 318 of FIG. 3 and c of FIG. 6. Upon receipt of the page response message in steps 410 of FIG. 4 and c of FIG. 6, the BS transmits a signal indicating successful paging, <Complete L3 Info: Paging Response> to the MSC in steps 412 of FIG. 4 and d of FIG. 6. The MSC determines whether the paging was successful or not according to the reception or non-reception of the signal <Complete L3 Info: Paging Response> in step 512 of FIG. 5. Upon receipt of the signal <Complete L3 Info: Paging Response>, the MSC re-establishes a communication link in steps 514 of FIG. 5 and f to u of FIG. 6. Then, the MSC releases the announcement of waiting for reconnection from the other subscriber. Meanwhile, if the signal <Complete L3 Info: Paging Response> has not been received in step 512 of FIG. 5, the MSC transmits an information message notifying the other subscriber of a reconnection failure in step 518 of FIG. 5 and then releases a call in step 520 of FIG. 5.

Upon receipt of a page response message in steps 410 of FIG. 4 and c of FIG. 6, the BS performs the subsequent paging steps (steps d to u of FIG. 6 and step 412 of FIG. 4) by the conventional paging method, like transmitting the signal <Complete L3 Info: Paging Response> to the MSC in step d of FIG. 6. Thus, call service (a call) is in progress in step 414 of FIG. 4.

After transmitting the page response message to the BS in step 318 of FIG. 3, the MS performs the subsequent paging steps by the conventional paging method in steps 320 to 328 of FIG. 3 so that a call service is in progress. More specifically, after the MS transmits the page response message to the BS, the MS determines whether a signal <Alert with Info> has been received in step 320 of FIG. 3. Upon receipt of the signal <Alert with Info>, the MS releases the waiting for reconnection notification in step 322, and then generates a ring sound in step 324 of FIG. 3. If the MS user responds in step 326 of FIG. 3, a call service state (a call state) is entered in step 328 of FIG. 3.

Figure 8:
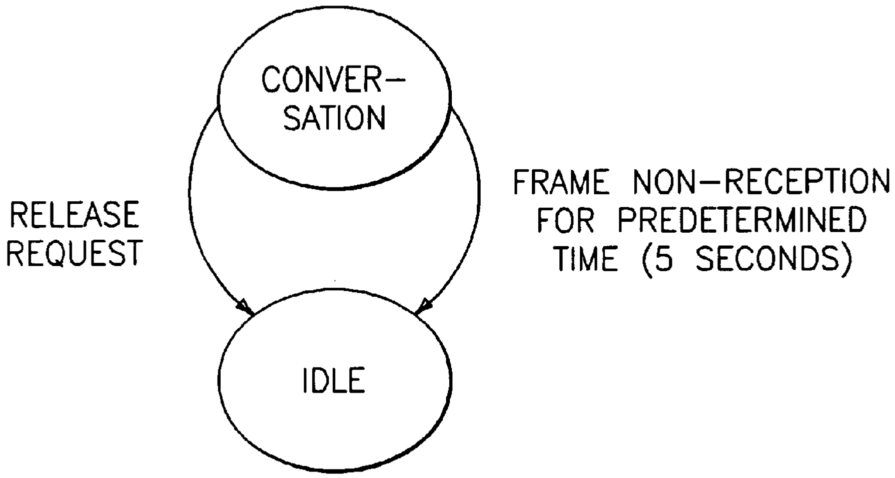
FIG. 8 is a state transition diagram for conventional call processing.
Figure 9:
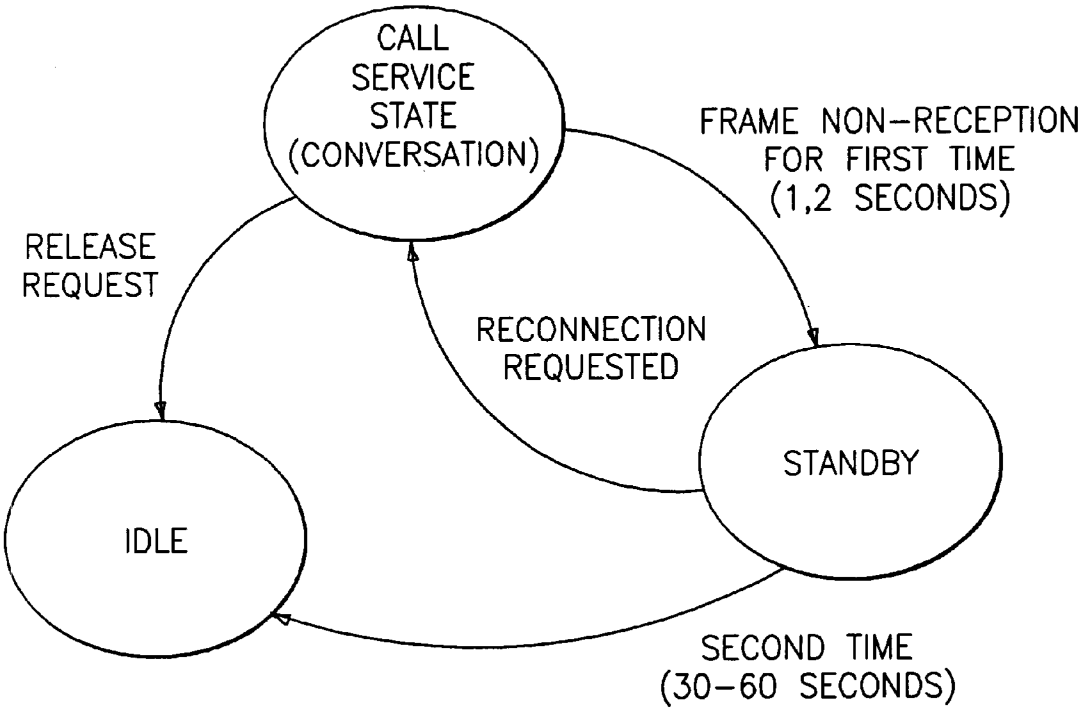
FIG. 9 is a state transition diagram for call processing according to an embodiment of the present invention.

FIGS. 8 and 9 illustrate the call processing state transitions in the conventional technology and in an embodiment of the present invention.

As shown in FIG. 8, upon a call release request or a call drop after a predetermined time, for example, 5 seconds during a call, the idle state is directly entered in the prior art. In comparison to the prior art, in an embodiment of the present invention as shown in FIG. 9, upon a call drop after a first predetermined time (preferably, 1.2 seconds) during a call service, a standby state is entered to await a call reconnection request, and the standby state transits to the conversation state by paging upon the call reconnection. However, if the call drop lasts for a second predetermined time (preferably, 30 to 60 seconds) in the standby state, the idle state is entered. If a call release is requested in the conversation or standby state, the idle state is immediately entered.

As described above, the present invention is advantageous in that the inconvenience of resuming a call temporarily dropped in an elevator or a tunnel is alleviated by providing an automatic dropped call reconnecting function through paging in a PLMN. Therefore, subscribers are relieved of the concern of call drops and call service quality can be increased.

While the invention has been shown and described with reference to a certain preferred embodiment thereof with a North American digital mobile communication system taken by way of example, the present invention can be applied to a GSM system based on pan-European digital mobile communication standards. Therefore, it should be understood by those skilled in the art that various changes in form and details may be made therein without departing from the spirit and scope of the invention as defined by the appended claims.

What is claimed is:

1. A method of reconnecting a communication link terminated by a service impediment during call service between a mobile terminal of a first subscriber and a terminal of a second subscriber communicating with the first subscriber through one of a plurality of base stations (BSs) connected to the mobile terminal and at least one of plurality of mobile switching centers (MSCs) connected to the BS in a mobile communication system having the plurality of BSs and the plurality of MSCs, the method comprising the steps of:

transmitting service impediment detection information from a serving BS to an MSC connected to the serving BS when the service impediment lasts for at least a predetermined time period as clocked by the MSC;

maintaining a service channel with the second subscriber by the MSC which receives the service impediment detection information;

attempting a reconnection paging at predetermined periodic intervals clocked by at least one of BSs which receive a reconnection paging request from the MSC; and reinitiating service between the mobile terminal of the first subscriber and the terminal of the second subscriber through a BS which receives a response for the reconnection paging from the mobile terminal of the first subscriber and one of the plurality of MSCs connected to the BS, when the mobile terminal of the first subscriber responds to the reconnection paging received within a predetermined time period clocked by the mobile terminal.

2. The method of claim 1, wherein the reconnection paging request is an existing paging request signal.

3. The method of claim 1, wherein the existing paging request signal includes a reconnection flag.

4. The method of claim 1, further comprising the step of sending, by the MSC, a message indicating that the MSC is waiting for a reconnection to a mobile terminal of the second subscriber.

5. The method of claim 1, wherein if a bad frame is received or frames are not successively received on a current traffic channel, it is determined that a service impediment has occurred.

6. The method of claim 1, wherein the MSC which receives the service impediment detection information makes the reconnection paging request after a first predetermined time period in which a general call release procedure is performed.

7. The method of claim 1, wherein the reconnection paging by at least one of BSs occurs repeatedly until the mobile terminal of the first subscriber responds to the reconnection paging.

8. The method of claim 1, wherein the MSC transmits the reconnection paging request to a cell where the mobile terminal of the first subscriber was located prior to detection of the service impediment.

9. The method of claim 1, wherein the MSC transmits the reconnection paging request to a first to cell where the mobile terminal of the subscriber was located prior to detection of the service impediment, and cells adjacent to the first cell.

10. The method of claim 1, wherein the MSC transmits the reconnection paging request to all the cells covered by the MSC, including a cell where the mobile terminal of the first subscriber was located prior to detection of the service impediment.

11. The method of claim 1, wherein the MSC which receives the service impediment detection information makes the reconnection paging request by use of an intersystem page if cells to page for reconnection are within a different MSC.

12. The method of claim 7, wherein a wider paging area is used upon each repetition of reconnection paging.

13. The method of claim 1, wherein the service impediment detection information is represented by information elements of an existing call release signal.

14. The method of claim 1, wherein the service impediment detection information is added to an existing call release signal.

15. The method of claim 1, wherein if the service reinitiation between the mobile terminal of the first subscriber and the terminal of the second subscriber fails, an information message is transmitted to the terminal of the second subscriber, notifying the second subscriber of the failed service reinitiation.

16. A method of reconnecting a communication link terminated by a service impediment during call service between a mobile terminal of a first subscriber and a terminal of a second subscriber communicating with the first subscriber through one of a plurality of base stations (BSs) connected to the mobile terminal and at least one of plurality of mobile switching centers (MSCs) connected to the BS in a mobile communication system having the plurality of BSs and the plurality of MSCs, the method comprising the steps of:

generating an information message for the first subscriber by the mobile terminal of the first subscriber, notifying the first subscriber of the service impediment, if the service impediment lasts for at least a predetermined first time period; and reinitiating service between the mobile terminal of the first subscriber and the terminal of the second subscriber through a BS which receives a response to a reconnection paging from one of the plurality of MSCs, when the mobile terminal of the first subscriber responds to the reconnection paging received from one of the plurality of BSs within a predetermined time period clocked by the mobile terminal.

17. The method of claim 16, wherein the mobile terminal releases the information message from the first subscriber and enters an idle state, if the reconnection paging is not received.

18. The method of claim 16, wherein the information message is one of a visual or aural notification to the first subscriber.

19. The method of claim 18, wherein the first subscriber is notified of the service impediment by one of illumination of a terminal light emitting diode, display on a terminal display, generation of a specific tone, and announcement by voice.

* * * * *